United States Patent
Ward et al.

(10) Patent No.: US 11,012,516 B1
(45) Date of Patent: May 18, 2021

(54) SYSTEM AND METHODS FOR DYNAMICALLY EXTENDING ANALYTICS IN A CLOUD COMMUNICATIONS PLATFORM

(71) Applicant: IntelePeer, Centennial, CO (US)

(72) Inventors: John Ward, Centennial, CO (US); Justin Bewley Lo, Centennial, CO (US); Adam Klodner, Centennial, CO (US); Julius Pasion, Centennial, CO (US)

(73) Assignee: IntelePeer, Centennial, CO (US)

( * ) Notice: Subject to any disclaimer, the term of this patent is extended or adjusted under 35 U.S.C. 154(b) by 0 days.

(21) Appl. No.: 16/918,267

(22) Filed: Jul. 1, 2020

Related U.S. Application Data

(60) Provisional application No. 63/020,511, filed on May 5, 2020.

(51) Int. Cl.
| | | |
|---|---|---|
| *H04L 29/08* | (2006.01) | |
| *H04M 3/51* | (2006.01) | |
| *H04M 3/42* | (2006.01) | |
| *H04M 3/523* | (2006.01) | |
| *H04M 15/00* | (2006.01) | |

(52) U.S. Cl.
CPC ........ *H04L 67/14* (2013.01); *H04M 3/42059* (2013.01); *H04M 3/5158* (2013.01); *H04M 3/523* (2013.01); *H04M 15/41* (2013.01)

(58) Field of Classification Search
CPC ... H04L 67/14; H04M 3/42059; H04M 3/523; H04M 3/5158; H04M 15/41
USPC ......................................................... 370/352
See application file for complete search history.

(56) References Cited

U.S. PATENT DOCUMENTS

| | | | |
|---|---|---|---|
| 7,912,983 B1 | 3/2011 | Ward et al. | |
| 2005/0276385 A1 | 12/2005 | McCormick et al. | |
| 2008/0086564 A1 | 4/2008 | Putman et al. | |
| 2012/0060219 A1* | 3/2012 | Larsson | H04L 43/026 |
| | | | 726/23 |
| 2015/0339370 A1* | 11/2015 | Onusko | G06F 16/284 |
| | | | 707/722 |
| 2015/0381806 A1* | 12/2015 | Estrada | H04L 65/60 |
| | | | 379/45 |
| 2016/0099848 A1 | 4/2016 | Krynski | |
| 2016/0352788 A1* | 12/2016 | Sawhney | H04L 65/1069 |
| 2018/0083849 A1* | 3/2018 | Droux | H04L 43/026 |
| 2018/0295167 A1* | 10/2018 | Lee | H04L 65/40 |

(Continued)

OTHER PUBLICATIONS

PCT/US2020/040560 International Search Report and Written Opinion dated Sep. 24, 2020, 7 pgs.

(Continued)

*Primary Examiner* — Binh Kien Tieu
(74) *Attorney, Agent, or Firm* — Perkins Coie LLP

(57) ABSTRACT

The disclosed technology provides a system and method for correlating events from a single application run in a cloud communications network using session identifiers uniquely identifying a communication session, and event identifiers uniquely identifying events in network elements of the cloud communication network. A data manager of the cloud communications network maps common fields and event-specific fields of network element event records to common fields and generic fields of a data warehouse based on the event type of the event to be recorded.

13 Claims, 4 Drawing Sheets

(56) References Cited

U.S. PATENT DOCUMENTS

| | | | | |
|---|---|---|---|---|
| 2019/0095320 A1* | 3/2019 | Biswas | ............... | G06F 21/552 |
| 2019/0294734 A1* | 9/2019 | Beringer | ............... | G06F 16/904 |
| 2019/0318100 A1* | 10/2019 | Bhatia | ............... | G06F 21/577 |
| 2020/0084280 A1* | 3/2020 | Malhotra | ............ | G06F 11/3058 |
| 2020/0301915 A1* | 9/2020 | Beringer | ............... | G06F 16/248 |

OTHER PUBLICATIONS

Estevez-Ayres, Iria, et al. "Lostrego: a distributed stream-based infrastructure for the real-time gathering and analysis of heterogenous educational data" Journal of Network and Computer Applications, Oct. 14, 2017, Madrid, Spain, 18 pages total.

\* cited by examiner

SYSTEM AND METHODS FOR DYNAMICALLY EXTENDING ANALYTICS IN A CLOUD COMMUNICATIONS PLATFORM

RELATED APPLICATIONS

This application claims priority to and benefit from U.S. Provisional Patent Application No. 63/020,511, entitled "SYSTEM AND METHODS FOR DYNAMICALLY EXTENDING ANALYTICS IN A CLOUD COMMUNICATIONS PLATFORM," filed on May 5, 2020, which is hereby incorporated by reference in its entirety.

BACKGROUND

Cloud communications solutions, including communication platform as a service (CPaaS) platforms, integrate a myriad of voice and data communications directly into business applications. By allowing businesses to embed communications into business applications and create customized flows, CPaaS allows businesses to better manage inbound and outbound interactions with customers thereby enhancing the customer experience. For example, marketing teams can create multi-channel campaigns starting from an email campaign, followed up with SMS or a phone call to ensure receipt, or a text message with a trackable online discount coupon code; the CPaaS platform can then send an automated survey to the customer after purchase or other interaction with the business and, depending on the result of the survey, automatically trigger certain follow-up actions such as initiating a voice call from an agent.

In order to enhance the customer experience and help businesses make better data-driven decisions, it is useful to collect and store analytics for all user interactions across the CPaaS platforms and external applications. However, because CPaaS supports omnichannel or cross-channel business communications channels, the source for telemetry regarding an application invocation or communication session can originate from different elements in the network. Additionally, new sources of telemetry data are constantly added as new communication channels to engage with customers are created or enabled. It is therefore beneficial and desirable to have a CPaaS system capable of tying together the potentially disparate sources of telemetry data while allowing for simple and seamless integration of new communication channels and/or data metrics.

DETAILED DESCRIPTION

The disclosed technology provides systems and methods for correlating events from a single application run in a omnichannel cloud communications network using session identifiers uniquely identifying a communication session, and event identifiers uniquely identifying events in network elements of the cloud communication network. The network elements receive traffic representing a communication session between devices. If the communication does not include a session identifier, the network element generates a unique session identifier and appends it to the communication session. The network element also creates a unique event identifier to uniquely identify the event (e.g., a phone call, text message, etc.). The network element generates a record of the event and a data manager translates common fields of the event record and event-specific fields to common and generic fields of a data warehouse (respectively) without having to create special schema for unique events that customer of the CPaaS network wishes to track. Additionally, if the user creates new fields that they wish to track as part of their CPaaS application, the data manager maps the newly created event type to generic fields of the data warehouse dynamically extending the collected analytics.

Various embodiments of the invention will now be described. The following description provides specific details for a thorough understanding and an enabling description of these embodiments. One skilled in the art will understand, however, that the invention can be practiced without many of these details. Additionally, some well-known structures or functions may not be shown or described in detail, to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
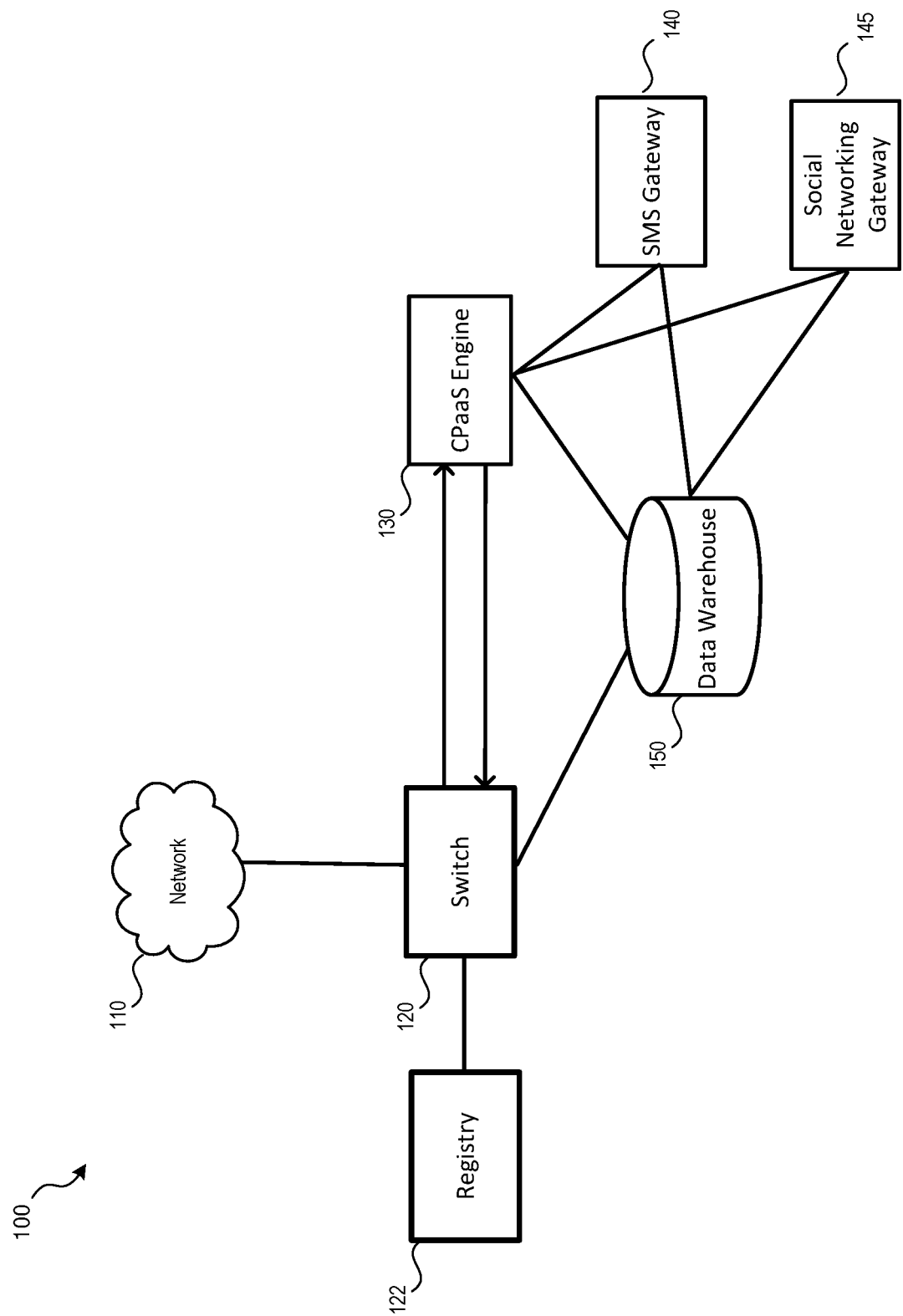
FIG. 1 is a representative system for dynamically extending analytics in a CPaaS network.

FIG. 1 is a representative system 100 for dynamically extending analytics in a CPaaS network. In one embodiment of the disclosed technology, network elements of the CPaaS network, for example, Switch 120, SMS gateway 140, Social Networking Gateway 145, or CPaaS Engine 130 receive traffic associated with a communication session e.g., traffic originating from network 110 (e.g., a public switched telephone network (PSTN) traffic).

Traffic from network 110 (e.g., PSTN) can be a telephone call, an inbound text message, an inbound social media messages, an API call into the CPaaS engine 130, etc. The different types of traffic are associated with different events which a user of the CPaaS application can track in an analytics tool of the CPaaS network to provide the user with analytics for all interactions across the CPaaS platform and on external applications integrated with the CPaaS platform. Example of analytics that the user can track includes whether a text message was delivered, duration of a telephone call, whether the telephone call was answered, the sentiment and tonality score measuring the relative mood of a caller, or the effectiveness of a customer service engagement. These individual data points can then be aggregated and grouped to provide trended reports and dashboards as well as predictions based on the trended data.

The disclosed technology allows to store unique events processed by each network element into a data warehouse 150 and correlate the events from the different network elements to identify all the events associated with a single application run. For example, when inbound traffic from network 110 is an SMS message, a registry element 122 (e.g., a SuperRegistry) can generate a unique session identifier (session ID) if one does not already exist and pass the session identifier to a CPaaS engine 130. The CPaaS engine uses the session identifier in subsequent events. For example, if the CPaaS engine 130 sends the SMS message and associated signaling to an SMS gateway 140, the CPaaS engine 130 passes the session identifier to the SMS gateway 140 (e.g., in call data record (CDR)). By passing the session identifier in signaling/messaging, the CPaaS network correlates all sessions together. When the SMS gateway 140 receives the inbound SMS from the CPaaS engine 130, it keeps track of the session identifier. It then appends event identifiers (transaction identifiers) to the communication session. If the SMS gateway 140 is the SMS initiator, it creates the session ID and passes the created Session ID to other network elements. The CPaaS engine similarly passes the session identifier to other gateways, for example Social Networking Gateway 145, which in turn append event identifiers to the corresponding communication sessions thereby correlating the sessions across different network elements.

Elements of the cloud communication network, for example, switch 120 and CPaaS engine 130 store event records in a data warehouse 150. For example, switch 120 can store a CDR to the data warehouse 150; CPaaS engine 130 can store SMS event records, DTMF event records, call event records, etc., to the data warehouse 150. As will be described further below in relation to FIG. 2, a data manager (not shown in FIG. 1) is provided with a schema for a certain event type (e.g., a dual tone multifrequency (DTMF) event associated with a telephone call), and the data manager uses the schema to map event-specific fields in event data records of network elements to generic fields in the data warehouse. By correlating the event data stored in the data warehouse using the session ID, a user can determine information from multiple network elements associated with the same application run which might not be possible otherwise. For example, the CPaaS engine 130 might not have information about whether the SMS message was delivered but the SMS gateway 140 could have this information. By correlating events in the CPaaS engine 130 and SMS gateway 140 using a single unique session ID, a user can query for that session ID to obtain all events associated with the SMS message and thereby determine if the SMS message was delivered (as well as other relevant statistics such as SMS delivery rates).

The disclosed technology eliminates the need to build dedicated schema-based data tables by translating, using event-specific schema, event-specific fields in event records into generic fields in the data warehouse. The disclosed technology also allows a user to easily augment what the user wishes to track (e.g., a new parameter, a new event, a new metric, etc.). For example, if user wishes for data to be loaded into a third-party application such as a customer response management (CRM) application, they can elect to track a customer identifier as part of the event record. The data manager can then map the customer identifier field to a generic field in the data warehouse when storing the data and map the generic field to the customer identifier field when the user queries for the data from the data warehouse. The data manager creates views so that a user can query the view to obtain stored analytics data with generic field names translated to event-specific names of events that the user tracks.

Figure 2:
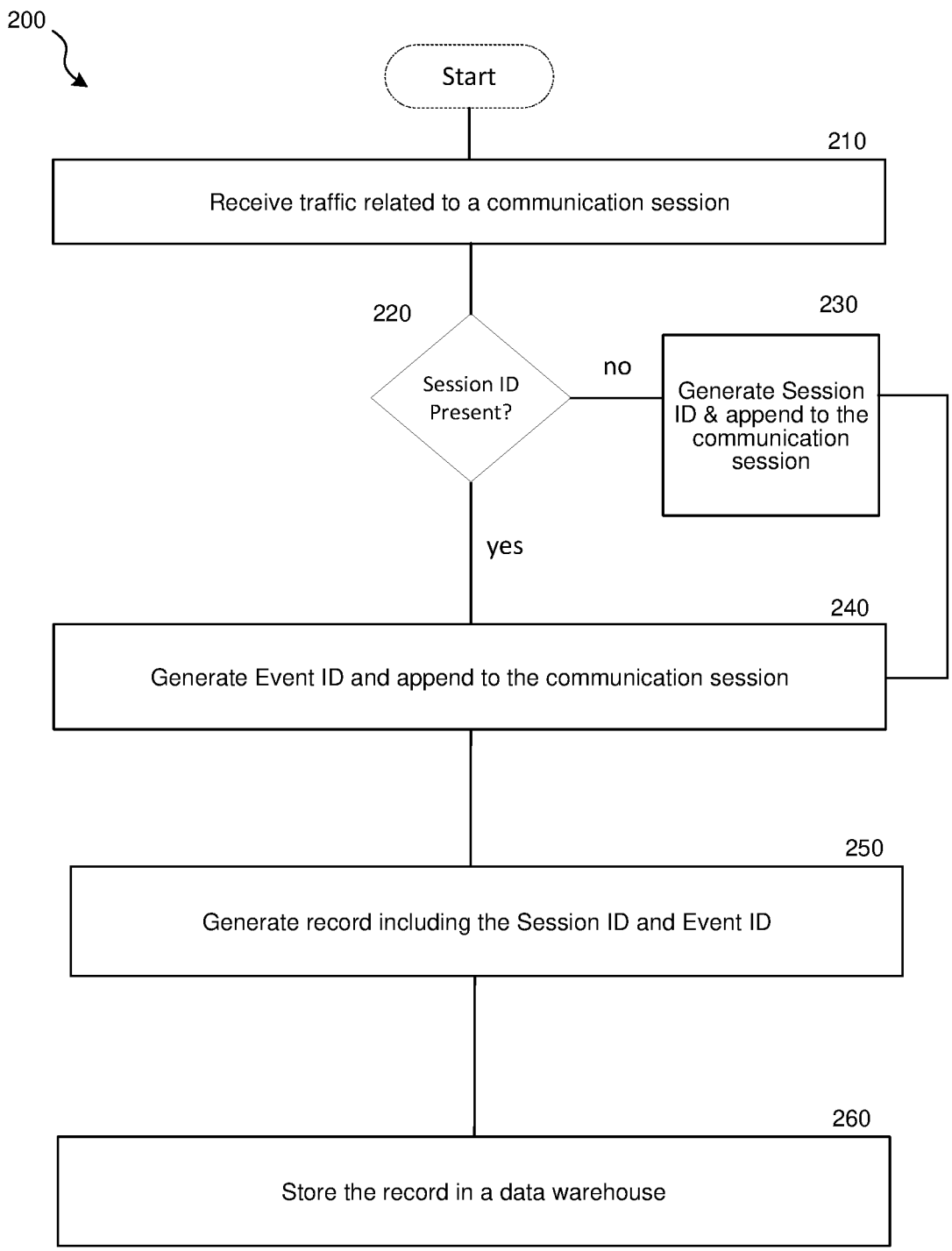
FIG. 2 is a representative flow diagram illustrating a method for correlating events from a single application run in a cloud communications platform.

FIG. 2 is a representative flow diagram 200 illustrating a method for correlating events from a single application run in a cloud communications platform. At block 210, a network element of the cloud communications platform receives traffic from a first device for transmission to a second device as part of a communication session between the first device and the second device, e.g., a call or text message communication. The communication session is part of a user-defined application run of the CPaaS platform. The application run can include a communication session traversing several network elements triggering different events of different event types. For example, an application run can include a communication session initiated by an inbound telephone call which triggers an outbound SMS message.

At block 220, the network element determines if the communication session includes a unique session identifier (Session ID), and if not, generates a unique session identifier at block 230 at appends it to the communication session. For example, if call traffic comes into the CPaaS platform from the public switched telephone network (PSTN), the network element (e.g., a registry or SuperRegistry element) can generated a Session ID as part of a predefined policy, and pass the generated Session ID to a CPaaS engine. The CPaaS engine would then use the generated Session ID for subsequent events. For example, if the CPaaS engine is configured to trigger an SMS event based on the call event, the CPaaS engine passes the Session ID in signalling related to the triggered SMS event. The Session ID thereby ties all events related to the same communication session or application run together regardless of the ingress and egress points, type of events, type of endpoints, or network elements that the application run touches.

At block 240, the network element generates a unique event identifier (Event ID) or transaction identifier specific to the event handled by the network element. For example, an event can be an inbound or outbound telephone call, an inbound or outbound SMS, an social media message, an API call into the CPaaS engine, etc. Whereas all network elements in the CPaaS platform use the same Session ID for the same application run, different network elements append different unique Event IDs corresponding to the events they handle.

At block 250, the network element generates a record of the event which is stored, at block 260, in a data warehouse. The CPaaS platform can use data in these generated records to provide analytics and insights for all interactions across the CPaaS platform and external applications. Views of the records (described later in relation to FIG. 4), can enable users of the CPaaS platform to better visualize the associated data and identify trends and insights needed to make better business decisions. The records include, among other values, the unique Session ID corresponding to the application run, and the unique Event ID. Other data in the record can include an event type field, an event time, event version, etc. As will be described further below, these fields can be used by a data manager to map event-specific named fields to generic fields in the data warehouse. As a result, the disclosed technology easily allows users of the CPaaS platform to add new fields that they wish to track as part of their CPaaS application, and automatically obtain a view of the data corresponding to those events without needed a database administrator to modify schemas used by the data warehouse. For example, a user might want to include an internal "Customer ID" in all their application events. The disclosed technology can accommodate that addition without the need for human intervention.

Figure 3:
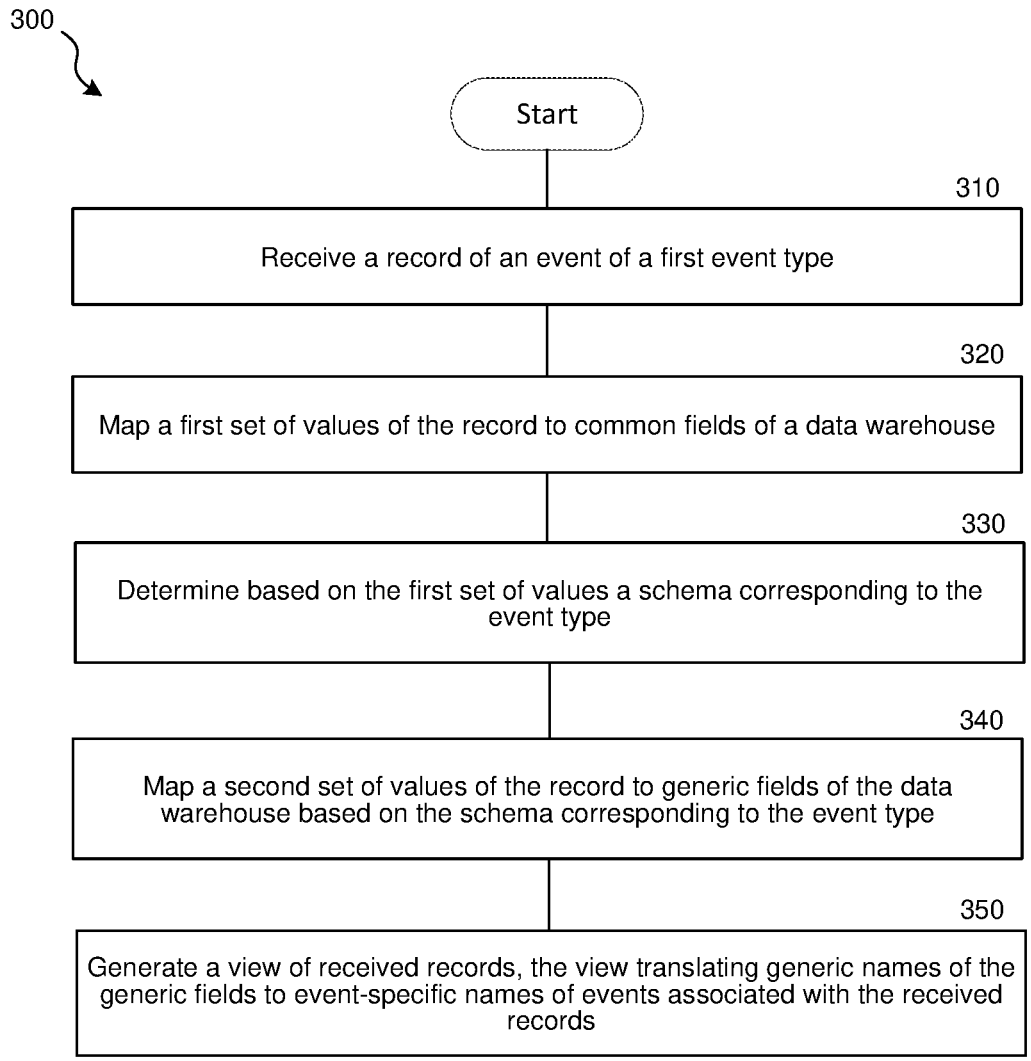
FIG. 3 is a representative flow diagram illustrating a method for inserting data into a data warehouse based on an event type.

FIG. 3 is a representative flow diagram 300 illustrating a method for inserting data into a data warehouse based on an event type. At block 310, a data manager receives a record of an event of a given event type from a network element (e.g., Registry 122, Switch 120, or CPaaS engine 130 in FIG. 1) of the cloud communications platform.

At block 320, the data manager maps a first set of values of the record to common field of the data warehouse. The common fields of the data warehouse correspond to the values that all the elements of the cloud communication platform or CPaaS must provide when they insert a record into the data warehouse. That is, the common fields represent data that is common to all the elements regardless of the type of events handled by the network element. For example, an element handling call events and an element handling SMS events would both provide data for common fields such as the event time, the unique identifier related to the communication session, the type of event, and the unique identifier related to the event, etc.

At block 330, the data manager determines based on values of the common fields an appropriate schema to use to map even-specific data to generic fields of the data warehouse. For example, based on the event type in the record, which is mapped to one of the common fields of the data warehouse, the data manager can determine the corresponding schema related to that event type from among other alternative pre-defined schemas. This allows the data manager to associate generically named fields to event-specific names. For example, an SMS event type may have SMS-specific fields such as character count, delivery confirmation, etc.; a call event type may have call-specific fields such as call duration, whether the call was answered, etc. Using a schema related to SMS events, the data manager can associate character count to one of the generic fields (e.g., named "generic1") and using a different schema related to call events can associate call duration to a different generic field (e.g., named "generic2"). Other event types, e.g., Facebook message event type, WhatsApp message event type, error event type, natural language processing (NLP) event type (e.g., how accurate the speech translation was), user-defined event type, etc., similarly include even-specific fields that are mapped to generic fields. This mapping from event-specific fields can be done on the fly (dynamically) or, in some embodiments, the data manager can pre-map the fields, for example, when a user selects statistics of events that they wish to track.

At block 340, the data manager maps selected values of the record to generic field of the data warehouse based on the schema identified in block 330. For example, if a user of the cloud communication platform wishes to track call duration, the data manager maps the values in the record corresponding to call duration to a generic field (e.g., a field named "generic3"). Although call duration data is stored in the data warehouse as, for example, "generic3" a query to the data warehouse using the unique session identifier "Session ID" for the communication session would return call duration data named in a manner recognizable to the user (e.g., named as "call duration data") and not as named in the generic fields of the data warehouse (e.g., "generic3").

At block 350, the cloud communication platform or CPaaS generates a view of the data in the received records where the view is specific to the user. That is, each user of the CPaaS can customize their view of the data in the data warehouse and focus on only those events that they wish to track. The generated view presents the event-specific names that the user wishes to track instead of the generic names used in the data warehouse.

In some embodiments, the data generated by the CPaaS network can be used to effect changes on the CPaaS network either generically or on behalf of the customer. For example, if a call center is inundated with inbound telephone calls (e.g., due to some natural event), the CPaaS network can monitor the call arrival rate, and an API into the CPaaS network can invoke an alternative call path, e.g., an offshore auxiliary call center. The monitoring can be, for example, via key process indicator (KPI) thresholding or can be an AI learning system trained to detect anomalies. That is, data provided by the CPaaS network (e.g., dynamically extendable analytics data) is monitored via an external engine reading and processing the data. When a condition is hit (e.g., KPI threshold or AI recommendation), the event invokes an associated API which can be part of the CPaaS application, and API in the customer premise, or an integration with a third-party system (e.g., open a support ticket, update a CRM field, etc.).

Figure 4:
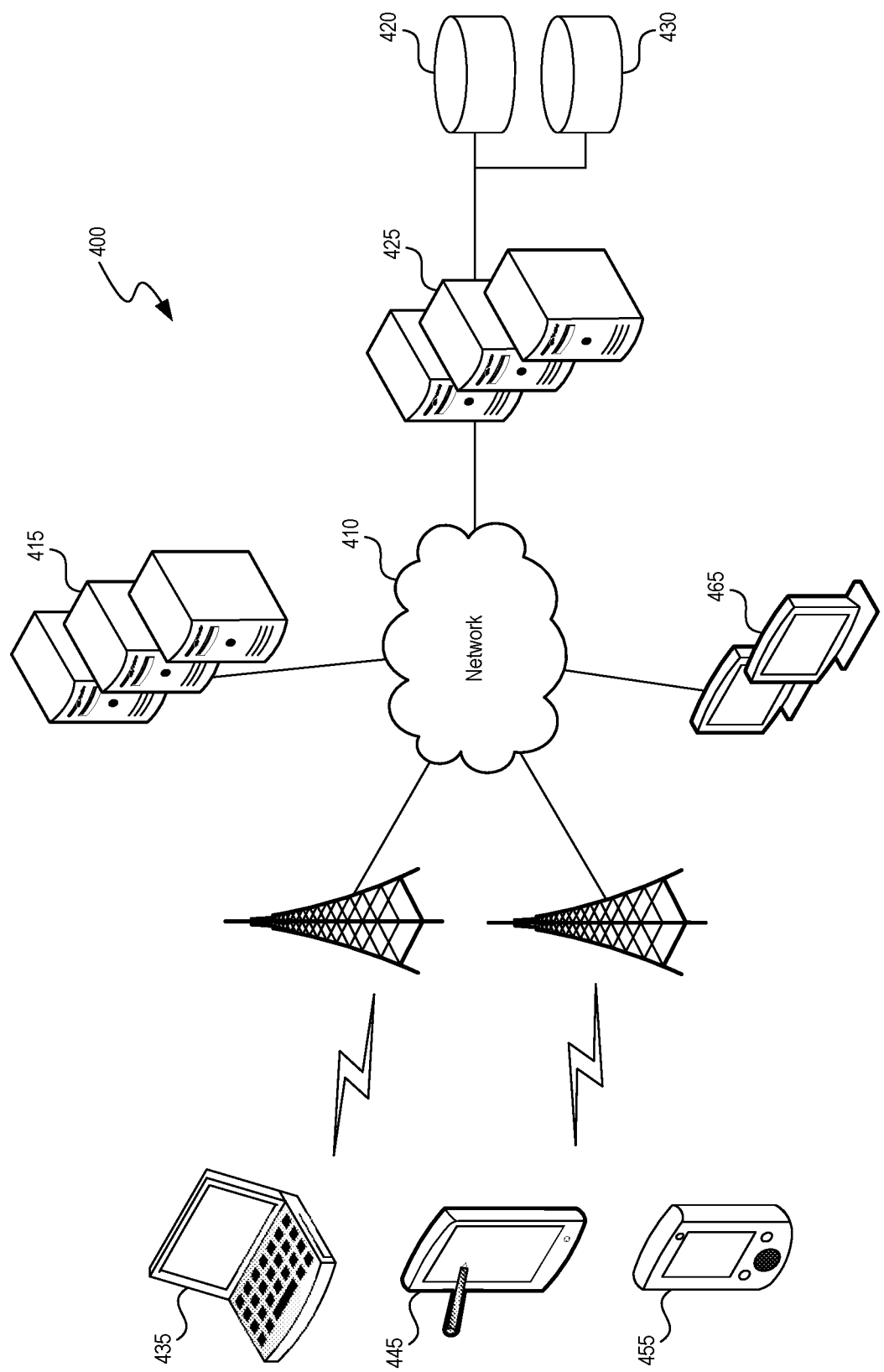
FIG. 4 is a representative environment in which the dynamically extendable CPaaS analytics platform can operate.

FIG. 4 and the following discussion provide a brief, general description of a suitable environment in which a dynamically extendable CPaaS analytics platform can operate. Although not required, aspects of the invention are described in the general context of computer-executable instructions, such as routines executed by a general-purpose computer, a personal computer, a server, or other computing system. The tool can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or any combination of such components. Computer-executable instructions may also be stored in one or more storage devices, such as magnetic or optical-based disks, flash memory devices, or any other type of non-volatile storage medium or non-transitory medium for data. A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes, modules and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Aspects of the disclosed technology can be practiced in distributed computing environments, where tasks or modules are performed by remote processing devices, which are linked through a communication network, such as a Local Area Network ("LAN"), Wide Area Network ("WAN"), or the Internet.

Referring to the example of FIG. 4, a representative environment 400 in which aspects of the described technology can operate include one or more client computing devices 435, 445, 455, and 465 capable of running a web browser of other desktop of server application, and servers 415 and 425, capable of interacting with a web server and remotely communicating with the client computing devices. The client computing devices communicate with the servers through network 410 including, for example, the Internet.

Aspects of the disclosed technology can be practiced by the client computing devices 435, 445, 455, and 465 and server devices 415 and 425. For example, client computing devices can run a web browser to login to a web application on a web server hosted on the server devices 415 and 425, provide user input via the web browser to configure the site analysis input parameters as needed, and trigger the computation of radio signal path profile computation on the web application or at the web server. The web application implementing the design and site analysis tool, or the web server serving the web application, can obtain additional input data from third party storage devices or servers 420 and 430. These storage devices can also be connected to the web server or client devices through the network 410 or can be warehoused locally on the server computers 415 and 425, or on the client devices 435, 445, 455, and 465.

Remarks

The figures and above description provide a brief, general description of a suitable environment in which the invention can be implemented. Although not required, aspects of the invention can be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations. The terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be in both local and remote memory storage devices. Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations can perform routines having steps/blocks, or employ systems having blocks, in a different order, and some processes or blocks can be deleted, moved, added, subdivided, combined, or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further any specific numbers noted herein are only examples: alternative implementations can employ differing values or ranges.

These and other changes can be made to the invention in light of the above Detailed Description. While the above description describes certain examples of the invention, and describes the best mode contemplated, no matter how detailed the above appears in text, the invention can be practiced in many ways. Details of the system can vary considerably in its specific implementation, while still being encompassed by the invention disclosed herein. As noted above, terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The invention claimed is:

1. A method implemented on a computing system for correlating events associated with communication sessions in a cloud communications platform, the method comprising:

receiving, at a network element of the cloud communications platform, traffic from a first device for transmission to a second device, wherein the traffic comprises a communication session between the first device and the second device;

determining, by the network element, if the communication session includes a session identifier, wherein the session identifier uniquely identifies the communication session in the cloud communications platform;

generating, by the network element, the session identifier in response to determining that the communication session does not include the session identifier and appending the session identifier to the communication session;

generating, by the network element, an event identifier and appending the event identifier to the communications session, wherein the event identifier uniquely identifies an event in the network element from among events in one or more network elements of the cloud communications platform;

generating, by the network element, a record of the event, wherein the record includes the session identifier and the event identifier; and, storing the record in a data warehouse.

2. The method of claim 1, wherein the event in the network element comprises at least one of an inbound telephone call, an outbound telephone call, an inbound text message, or an outbound text message.

3. The method of claim 1, wherein the event in the network element comprises an application programming interface (API) call into a processing engine of the cloud communications platform.

4. The method of claim 1, wherein the data warehouse comprises one or more common fields and one or more generic fields, wherein the record includes a value for each one of the one or more common fields, and a value for at least one of the one or more generic fields.

5. The method of claim 4, wherein the one or more common fields includes at least one of a session identifier, an event identifier, an event type, or an event time.

6. The method of claim 4, wherein the value for the at least one of the one or more generic fields is based on an event type of the event in the network element associated with the record.

7. The method of claim 6, wherein the event type is at least one of a dual-tone multifrequency (DTMF) event type, an SMS event type, a call event type, a Facebook message event type, a WhatsApp message event type, an error event type, or a natural language processing event type.

8. The method of claim 6, wherein a data manager maps event-specific data values to the one or more generic fields based at least in part on information in the one or more common fields and a schema specific to the event type.

9. The method of claim 8, wherein the information in the one or more common fields includes at least one of information about the event type, or a version of the event type.

10. The method of claim 6, further comprising:
receiving an indication of a new event that a user of the cloud communications platform selects to track;
creating a new event type; and,
mapping by a data manager unique fields of the new event type to one or more of the generic fields of the data warehouse, wherein the mapping further comprises selecting a schema specific to the new event type from among a plurality of schemas.

11. The method of claim 10, further comprising creating a new view corresponding to one or more events that the user of the cloud communications platform selects to track, wherein the data warehouse is configured to return event-named fields of the one or more events corresponding to data in the one or more generic fields of the data warehouse in response to a query request targeted to the new view.

12. The method of claim 8, further comprising:
receiving a modified version of the schema specific to the event type; and,
remapping by the data manager the event-specific data values to the one or more generic fields based at least in part on information in the modified version of the schema.

13. The method of claim 1, further comprising:
sending a query request to the data warehouse, wherein the query request includes the session identifier; and,
receiving, in response to the query request, one or more records associated with the communication session, wherein each one of the one or more records includes a unique event identifier that uniquely identifies one or more events in the one or more network elements of the cloud communications platform.

\* \* \* \* \*